(No Model.)
M. W. LONG.
AUTOMATIC CIRCUIT BREAKER FOR RAILROAD SIGNALS.
No. 289,008. Patented Nov. 27, 1883.
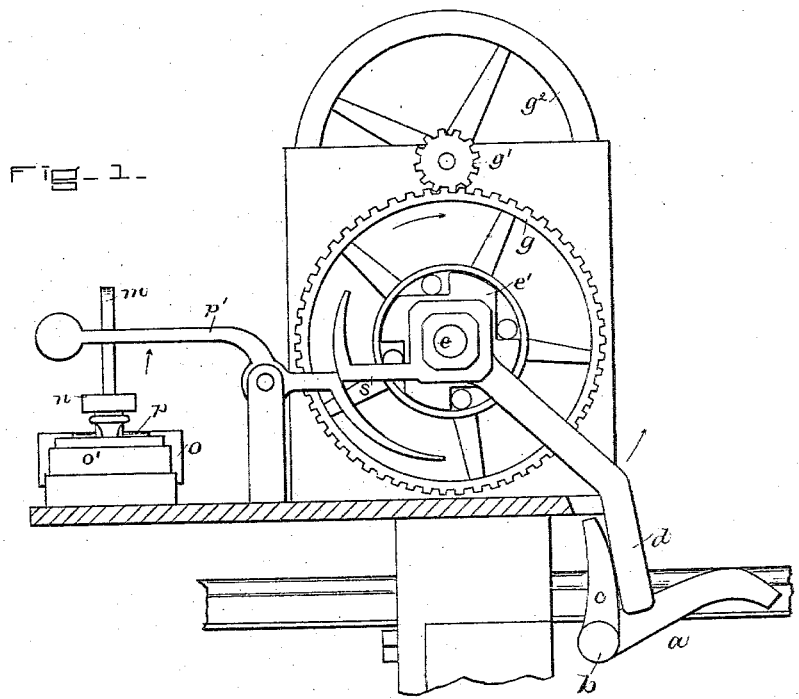
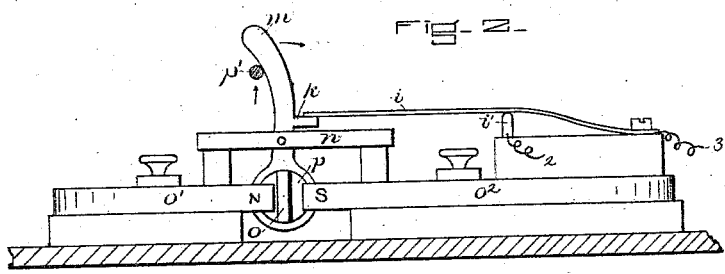
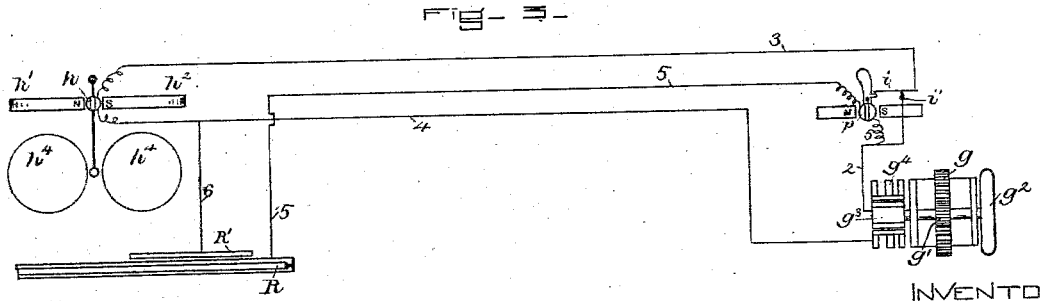
WITNESSES
A. O. Orne
Fred A. Powell
INVENTOR
Malcolm W. Long
by Crosby & Gregory
Atty's

UNITED STATES PATENT OFFICE.

MALCOLM W. LONG, OF HYDE PARK, MASSACHUSETTS.

AUTOMATIC CIRCUIT-BREAKER FOR RAILROAD-SIGNALS.

SPECIFICATION forming part of Letters Patent No. 289,008, dated November 27, 1883.

Application filed April 16, 1883. (No model.)

*To all whom it may concern:*

Be it known that I, MALCOLM W. LONG, of Hyde Park, county of Norfolk, State of Massachusetts, have invented an Improvement in Automatic Circuit-Breakers for Railroad-Signals, of which the following description, in connection with the accompanying drawings, is a specification, like letters on the drawings representing like parts.

My invention relates to an automatic circuit-breaker, shown as employed in connection with an alarm or signal for highway-crossings, actuated by currents generated or applied by trains approaching the said highway-crossing.

I have invented a magneto-electric generator which will form the subject of another application for Letters Patent, the said generator containing a rotary armature and means to set it in motion by the action of the passing trains, so as to generate an alternating or intermittent current, by which the alarm or signal at the crossing is operated.

In order to maintain the alarm in operation during the period of time after the train has passed the generator and before it arrives at the crossing, the parts of the generator are properly constructed to have sufficient momentum to keep it in operation for a considerable length of time, sufficient for a slow-moving train to reach the crossing. As a fast train would reach the crossing in much less time, the signal would continue to operate after the train had passed it, unless some means were provided to stop it, and the circuit-breaker, which, together with the means for operating it, forms the subject of the present application, is employed for this purpose. The said circuit-breaker is automatically operated by the mechanism which sets the generator in motion to close the main circuit from the generator to the signal, and a branch circuit extending from the signal to the generator is closed by the train passing the signal to cause the current of the generator to operate the automatic circuit-breaker to open the said main circuit from the generator to the signal, and thus stop the operation of the latter. The automatic circuit-breaker consists, in this instance, of an armature wound with a coil, so as to constitute an electric magnet, it being pivoted to move between the poles of two permanent magnets, one of greater strength than the other, and placed with unlike poles opposite one another. Either of the said permanent magnets is of sufficient strength to retain the armature attracted when the said armature is moved up to its poles, and the said armature is positively moved up to the weaker magnet by mechanism actuated by the train passing the generator, it being held there by the attraction of the said weaker magnet as long as the armature remains neutral, or while no current is passing through its coil. In this position it retains the main circuit from the generator to the signal closed, so that the signal continues in operation. The branch circuit from the signal to the generator includes the coils of the armature of the automatic circuit-breaker, and also includes a circuit-closer located at or near the signal, and shown in this instance as consisting of one of the rails of the track and an auxiliary rail or bar of metal placed at the side of the said rail and insulated from it, the said bar and rail being electrically connected by the treads of the wheels, to thus complete the circuit through the coils of the armature of the circuit-breaker, and cause the intermittent current from the generator to traverse the said coils, and to thus magnetize the armature with sufficient power to neutralize the attractive force of the small permanent magnet, at the same time increasing the attractive force between it and the larger magnet, so that the said armature moves over to the poles of the larger magnet, which is of sufficient strength to retain it in spite of the reversal of the current in the coils around the armature. In this position the said armature breaks the circuit from the generator to the signal, which then remains silent or concealed after the train has arrived at or passed it.

Figure 1 is a side elevation of the generator and connected automatic circuit-breaker, the latter being shown in end elevation; Fig. 2, a side elevation of the circuit-breaker, and Fig. 3 a diagram showing the circuits.

The generator G is set in operation through the action of the wheels of the train upon a treadle, *a*, (shown in Fig. 1 as partially depressed,) connected with the rock-shaft *b*, having an arm, *c*, which acts upon the actuating-lever *d*, fixed upon the shaft *e*, moving it in the direction of the arrow. The said lever *d* and shaft $e$ in the return movement, caused by the weight of the said lever and a suitable spring, (not shown in the present application,) acts through a clutch mechanism, $e'$, shown as a hub having ratchet-shaped recesses containing loose cylinders adapted to be wedged between it and a surrounding cylinder connected with the gear $g$, loose on the shaft $e$, causing the said gear to turn with the shaft and lever in their return movement in the direction of the arrow thereon. The said gear meshes with a pinion, $g'$, shown in this instance as mounted on a shaft provided with a fly-wheel, $g^2$, and an armature, $g^3$, (see Fig. 3,) which is thus rotated between the poles of a series of magnets, $g^4$, generating a series of intermittent and preferably alternating electric currents which are transmitted through the main circuit 2 3 4 to the signal S, consisting in this instance of an armature, $h$, having a helix included in the said circuit and mounted to vibrate between two permanent magnets, $h'$ $h^2$, placed with unlike poles opposite, as indicated, so that at each reversal of the current the said armature vibrates from one magnet toward the other, thus causing the bell-hammer, $h^3$, connected with it to strike the bells $h^4$, located near the highway-crossing, and thus affording sufficient warning that the train is approaching, although at the point where the generator is set in operation the train may not be in sight.

The gearing and fly-wheel of the generator is so constructed as to acquire sufficient momentum to remain in operation during the time occupied by the train in passing from the generator G to the signal S, and in the case of fast-moving trains it will run for a much longer time, so that it will continue in operation after the train has passed the said signal.

In order to prevent the signal from continuing to sound after the train has passed it, the main circuit 2 3 4, between the generator and signal, includes a circuit-breaker consisting of a spring, $i$, and contact-point $i'$, which, when in contact, complete the said circuit. The spring $i$ rests on a finger, $k$, connected with a lever, $m$, pivoted at $n$, and provided with an armature, $o$, of soft iron, having a coil, $p$, wound around it, so that when a current passes through the said coil the armature is polarized or converted into an electro-magnet. The said armature is placed between the poles of two permanent magnets, $o'$ $o^2$, the former of which is of less strength than the latter, but of sufficient strength to hold the armature $o$ when moved up to its poles, and while no current is circulating through the coils $p$. The armature $o$ is mechanically detached from the poles of the magnet $o^2$ and moved up to the poles of the magnet $o'$ by a lever, $p'$, (see Fig. 1,) having one arm adapted to act upon the curved end of the supporting-lever $m$ of the armature $o$, and its other arm adapted to be acted upon by the projection $s$ of the actuating-lever $d$ of the generator, so that when the said lever $d$ is moved in the direction of the arrow, Fig. 1, by the passing train, the projection $s$, engaging the lever $p'$, moves the end of the latter upward against the armature-lever $m$, causing the latter to swing on its pivot, as indicated by the arrow, Fig. 2, moving the armature $o$ toward the poles of the magnet $o'$, and permitting the spring $i$ to come in contact with the contact-point $i'$. The engaging parts of the lever $p'$ and projection $s$ have arc-shaped continuations, by which they are retained in engagement until the arm $d$ returns to its normal position. The coils of the armature $o$ are included in a branch circuit, 5, leading from the wire 2 of the main circuit to one portion of a circuit-closer located near the signal, it consisting in this instance of the rail R and an auxiliary rail or bar, R', near to the said rail, and insulated therefrom, but adapted to be touched by the treads of the wheels passing over the said rail R, the wheels thus connecting the parts R R', and thus closing the circuit through the coils of the armature $p$, the said rail R' being connected by wire 6 with the wire 4 of the main circuit. The current from the coils of the armature of the generator, if it still remains in motion, will thus be caused to pass through the coils $p$ of the armature $o$, and as the said current alternates the polarity of the said armature $o$ will be reversed, it being at times of such polarity as to neutralize the attraction of the magnet $o'$ and increase that of the magnet $o^2$, so that the said armature will be moved by the latter from the poles of the magnet $o'$ to those of the magnet $o^2$, thus causing the projection $k$ to raise the spring $i$ and disconnect it from the contact-point $i'$, thus breaking the main circuit from the generator to the signal. Owing to the greater strength of the magnet $o^2$, the currents passing through the coils $p$ of the armature $o$ will not be sufficient to neutralize the attraction of the said magnet $o^2$, which will retain the armature up to its poles until positively moved therefrom by the action of the levers $p'$ and $d$ upon the passage of another train.

The invention is not limited to any particular form of generator or of the receiving-instrument or signal actuated by it, and it is obvious that a battery might be employed to generate or produce the electric current for operating the signal and circuit breaker, and that the said signal might be a visual instead of an audible one.

I claim—

1. The combination of the generator and main circuit leading therefrom with a circuit-breaker forming a part of the said circuit and a normally-open branch circuit from the generator, including a coil for actuating the main circuit-breaker, and a circuit-closer in the said branch circuit, whereby the current from the generator may be caused to pass through the said coil, which thus operates the circuit-breaker to open the main circuit, substantially as described.

2. The generator set in operation by a passing train and adapted to remain in operation by the momentum of its parts and the signal or instrument operated by the current produced, combined with a circuit-breaker in the main circuit connecting the said generator and signal, and the mechanism actuated by the train for closing the said circuit-breaker when the generator is set in operation, substantially as described.

3. The generator set in operation by the passing train, and its main circuit and signal and circuit-breaker therein, combined with the mechanism for closing the said circuit-breaker when the generator is set in operation, and the branch circuit from the generator and circuit-closer therein operated by the passing train, and the helix or electro-magnet in the said branch circuit, whereby the circuit-breaker is operated to open the main circuit when the said branch circuit is closed, substantially as described.

4. The generator and its actuating-arm, provided with a projection combined with the circuit-breaker in the main circuit therefrom, and its actuating-lever operated by the said projection, substantially as described.

5. The pivoted armature-lever and its armature, provided with a coil combined with the magnets of different strength at either side of the said armature, with unlike poles opposite, the weaker magnet being sufficient to hold the armature while no current is circulating through its coils, and the stronger magnet drawing up and retaining the said armature when a current of proper polarity is passed through its coil, substantially as described.

6. The combination of the actuating-arm $d$, having a projection, the lever operated by the said projection, and the armature-lever actuated thereby, with the armature and its coils and the permanent magnets co-operating therewith, substantially as described.

In testimony whereof I have signed my name to this specification in the presence of two subscribing witnesses.

MALCOLM W. LONG.

Witnesses:
JOS. P. LIVERMORE,
W. H. SIGSTON.